United States Patent [19]
Fujii et al.

[11] Patent Number: 6,138,582
[45] Date of Patent: Oct. 31, 2000

[54] SYNTHETIC RESIN PALLET AND MANUFACTURING METHOD THEREFOR

[75] Inventors: Mitsuru Fujii, Urawa; Tomoyuki Dobashi, Fujisawa; Kiyoshi Kurosawa, Sayama; Junro Sugihara, Tokyo, all of Japan

[73] Assignees: Dainippon Ink and Chemicals, Inc., Tokyo; Nippon Plastic Pallet Corporation, Ueda, both of Japan

[21] Appl. No.: 09/273,471

[22] Filed: Mar. 22, 1999

[30] Foreign Application Priority Data

Mar. 24, 1998 [JP] Japan .................................. 10-076306

[51] Int. Cl.7 .................................................. B65D 19/00
[52] U.S. Cl. .......................................................... 108/57.25
[58] Field of Search .............................. 108/57.26, 57.25, 108/57.27, 901, 902

[56] References Cited

U.S. PATENT DOCUMENTS

| | | | |
|---|---|---|---|
| 3,680,496 | 8/1972 | Westlake, Jr. ......................... | 108/57.26 |
| 3,757,704 | 9/1973 | Allgeyer et al. ...................... | 108/57.26 |
| 3,868,915 | 3/1975 | Hafner ................................... | 108/57.26 |
| 3,938,448 | 2/1976 | Nishitani et al. ..................... | 108/57.26 |
| 4,013,021 | 3/1977 | Steinlein et al. ...................... | 108/57.25 |
| 4,051,787 | 10/1977 | Nishitani et al. .. | |
| 4,133,270 | 1/1979 | Ravera ................................. | 108/57.26 X |
| 5,401,347 | 3/1995 | Shuert ................................. | 108/57.27 X |
| 5,555,820 | 9/1996 | Shuert ................................. | 108/57.25 |

FOREIGN PATENT DOCUMENTS

| | | |
|---|---|---|
| 0 798 220 | 10/1997 | European Pat. Off. . |
| 2 064 131 | 7/1972 | Germany . |
| 93 14 468 U | 3/1995 | Germany . |
| 1 533 886 | 11/1978 | United Kingdom . |

*Primary Examiner*—Jose V. Chen
*Attorney, Agent, or Firm*—Armstrong, Westerman, Hattori, McLeland & Naughton

[57] ABSTRACT

With a synthetic resin pallet provided with large open portions in an under surface portion for handling with a hand lifter, the aim is to improve the strength of the under surface portion. Therefore there is provided a synthetic resin pallet having an upper surface portion and an under surface portion which is provided with large open portions, the upper surface portion and the under surface portion being connected by columns, with fork insertion apertures formed between the columns, the synthetic resin pallet being integrally formed by connecting a pallet upper part integrally formed with the upper surface portion and column main portions, and a strengthened pallet lower part integrally formed with the under surface portion and column lower end portions, by the respective columns.

15 Claims, 15 Drawing Sheets

SYNTHETIC RESIN PALLET AND MANUFACTURING METHOD THEREFOR

BACKGROUND OF THE INVENTION

1. Field of the Invention

The present invention relates to a synthetic resin pallet used when transporting and storing various goods, and to a manufacturing method therefor.

2. Description of the Related Art

When various goods are to be loaded onto and transported on a synthetic resin pallet, or when the synthetic resin pallet loaded with the various goods is to be handled using a hand lifter, a synthetic resin pallet provided with large open portions in an under surface portion is used.

However, with a synthetic resin pallet provided with large open portions in the under surface portion, the strength of the under surface portion is reduced. Therefore, in an automated warehouse, when the under surface portion of a synthetic resin pallet loaded with goods is supported and moved, or when synthetic resin pallets loaded with goods are stacked up on the floor, the under surface portion is subjected to high loadings and is thus susceptible to damage.

SUMMARY OF THE INVENTION

The present inventors arrived at the present invention as a result of progress with intense research into synthetic resin pallets provided with large open portions in the under surface portion for handling with a hand lifter, the research being aimed at improving the strength of the under surface portion.

The present invention relates to a synthetic resin pallet having an upper surface portion and an under surface portion which is provided with large open portions, the upper surface portion and the under surface portion being connected by columns, with fork insertion apertures formed between the columns, and is characterized in being integrally formed by connecting a pallet upper part integrally formed with the upper surface portion and column main portions, and a strengthened pallet lower part integrally formed with the under surface portion and column lower end portions, by the respective columns.

The present invention relates to the synthetic resin pallet, wherein the connection by each column is provided by heat welding.

The present invention relates to the synthetic resin pallet, wherein the pallet lower part is strengthened by adding a filler.

The present invention relates to the synthetic resin pallet, wherein the filler is talc, calcium carbonate, glass fiber or carbon fiber.

The present invention relates to the synthetic resin pallet, wherein the shape of the under surface portion in underside view is approximately the shape of a rectangle divided by a horizontal and a vertical line.

The present invention relates to the synthetic resin pallet, wherein the shape of the under surface portion in underside view is approximately the shape of a rectangle divided by a horizontal line.

The present invention relates to the synthetic resin pallet, wherein reinforcing ribs are formed on an inner face side of the upper surface portion.

The present invention relates to the synthetic resin pallet, wherein hollow portions are formed in the pallet upper part.

The present invention relates to the synthetic resin pallet, wherein hollow portions are formed in the pallet lower part.

The present invention relates to the synthetic resin pallet, wherein the columns comprise corner columns formed at respective corners, intermediate portion columns formed at intermediate portions of respective sides, and a central portion column formed at a central portion, and the fork insertion apertures are formed between the columns.

The present invention relates to the synthetic resin pallet, wherein the columns comprise side columns formed along a pair of opposite sides, and a central column formed in parallel with and at a central portion between the side columns, and the fork insertion apertures are formed between the columns.

The present invention relates to a method of manufacturing the synthetic resin pallet characterized in that the pallet upper part integrally formed with the upper surface portion and the column main portions is formed by injection molding, and the strengthened pallet lower part integrally formed with the pallet under surface portion and the column lower end portions is formed by injection molding, after which the pallet upper part and the pallet lower part are integrally connected by the respective columns.

The present invention relates to the method of manufacturing a synthetic resin pallet, wherein the integrality is formed by providing the connection by each column by heat welding.

The present invention relates to the method of manufacturing a synthetic resin pallet, wherein the heat welding is effected using a metal plate which has been heated and subjected to surface stripping treatment.

With the synthetic resin pallet according to the present invention, even though the large open portions are provided in the under surface portion, since the under surface portion is strengthened it has substantial strength. Therefore the synthetic resin pallet can be ideally used in an automated warehouse where the under surface portion is supported and moved by the forks of a stacker crane, or when synthetic resin pallets loaded with goods are stacked up on the floor.

Moreover, with the synthetic resin pallet according to the present invention, by integrally connecting the pallet upper part and the pallet lower part by the column portions by heat welding, the manufacturing time can be shortened, and the strength of the synthetic resin pallet can be increased.

Furthermore, with the synthetic resin pallet according to the present invention, by forming hollow portions in predetermined portions of the pallet upper portion and/or the pallet lower portion, the pallet can be lightened.

DESCRIPTION OF THE PREFERRED EMBODIMENTS

As follows is a description of preferred embodiments of a synthetic resin pallet and manufacturing method therefor according to the present invention, with reference to the drawings.

The present invention relates to a synthetic resin pallet having an upper surface portion 11 and an under surface portion 21 which is provided with large open portions 22, the upper surface portion 11 and the under surface portion 21 being connected by columns 3, with fork insertion apertures 4 formed between the columns 3, and is characterized in being integrally formed by connecting a pallet upper part 1 integrally formed with the upper surface portion 11 and column main portions 13, and a strengthened pallet lower part 2 integrally formed with the under surface portion 21 and column lower end portions 23, by the respective columns 3.

As follows is a description of an embodiment of a synthetic resin pallet and manufacturing method therefor according to the present invention, with reference to FIG. 1 through FIG. 9.

Figure 1:
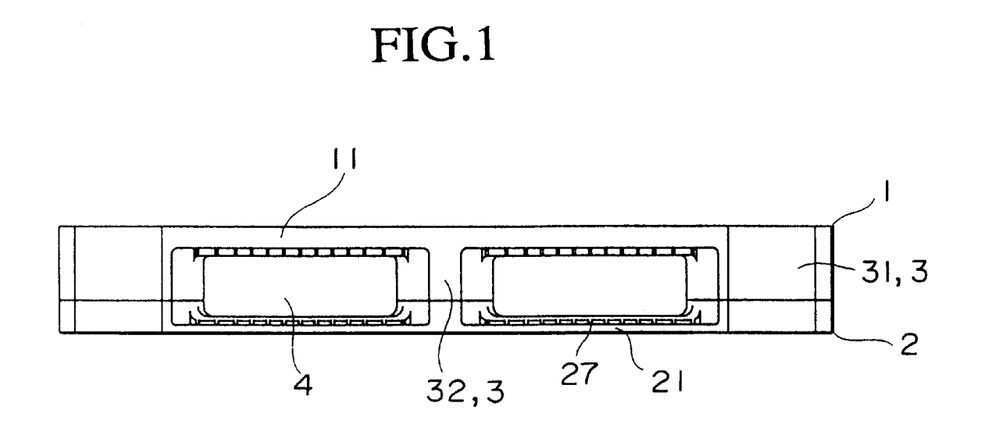
FIG. 1 is a front view showing an embodiment of a synthetic resin pallet according to the present invention.
Figure 2:
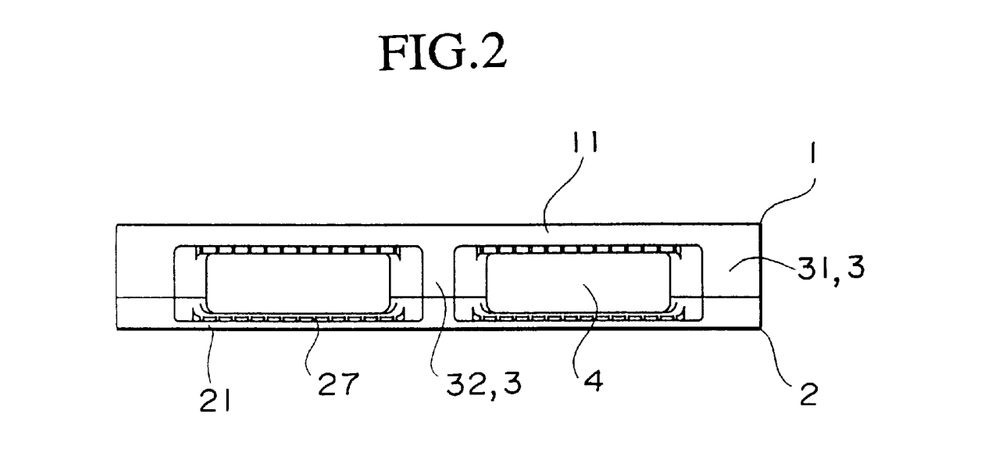
FIG. 2 is side view of the synthetic resin pallet of FIG. 1.
Figure 3:
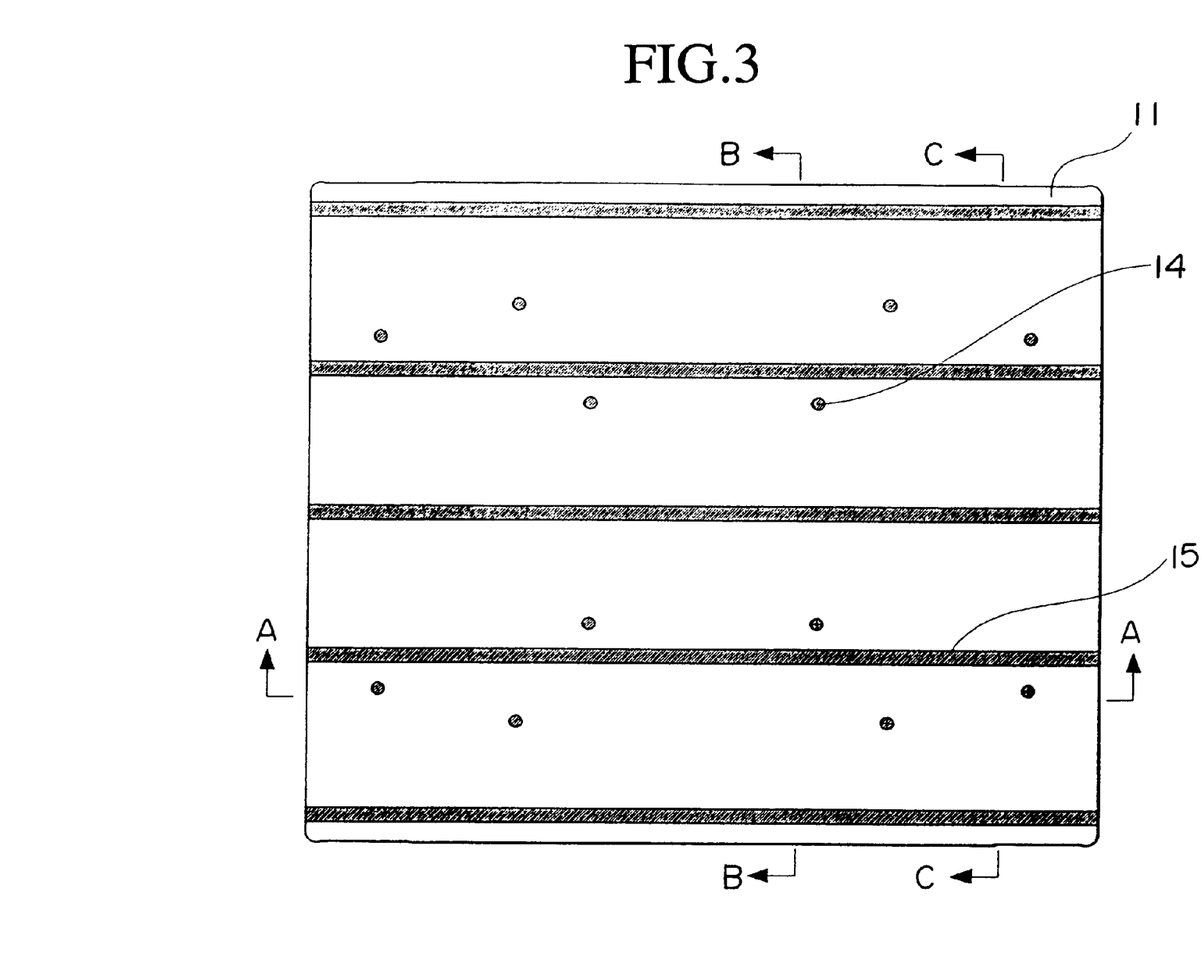
FIG. 3 is a plan view of the synthetic resin pallet of FIG. 1.

The synthetic resin pallet has an upper surface portion 11 and an under surface portion 21 which is provided with large open portions 22, with the upper surface portion 11 and the under surface portion 21 being connected by columns 3, with fork insertion apertures 4 formed between the columns 3.

Figure 4:
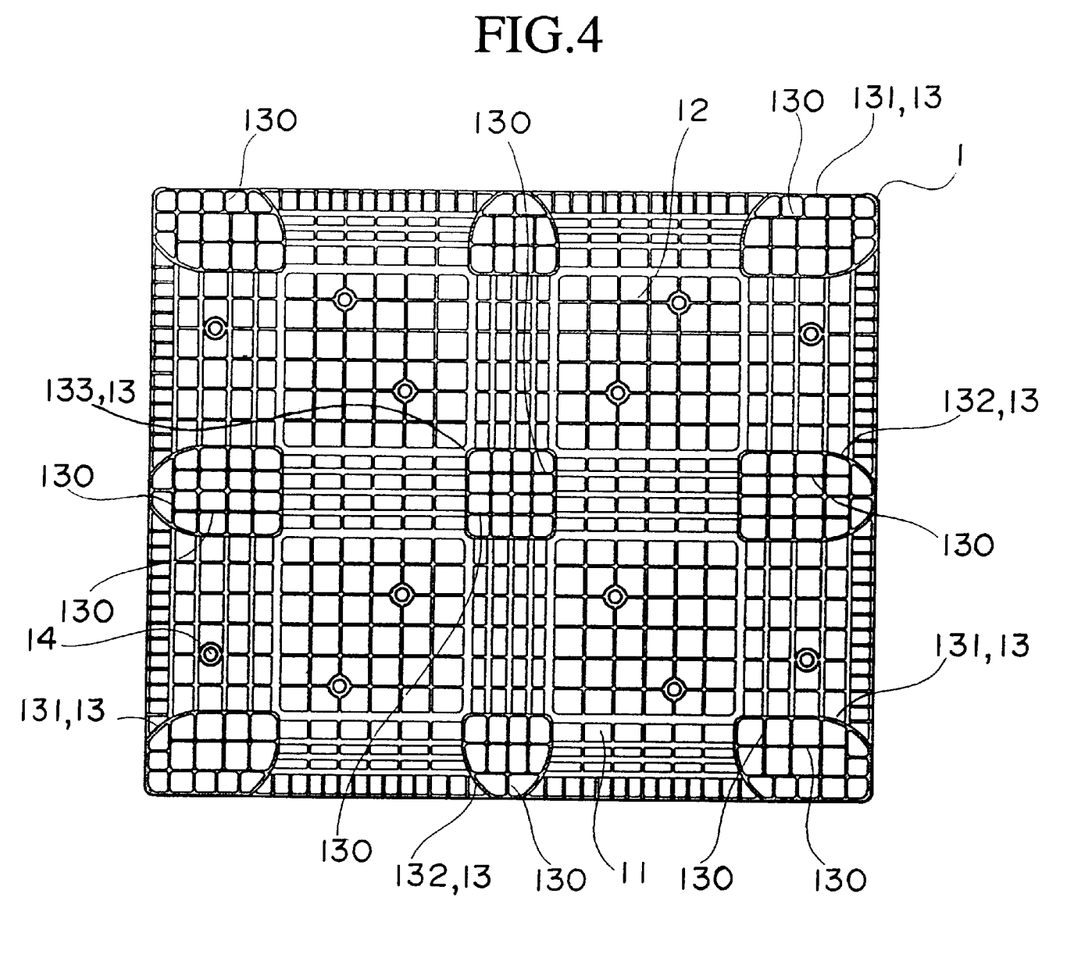
FIG. 4 is an underside view of a pallet upper part in the synthetic resin pallet shown in FIG. 1.
Figure 5:
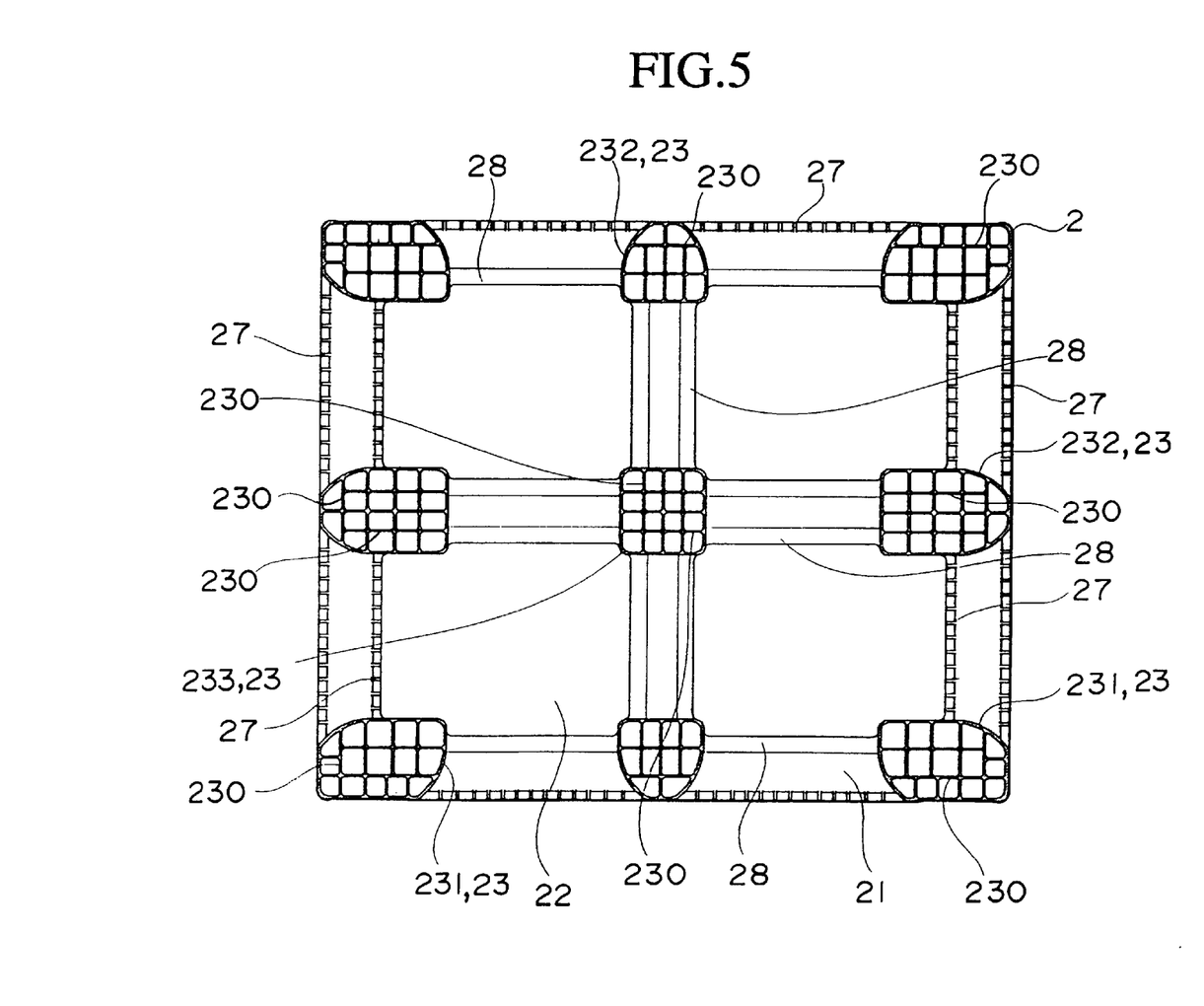
FIG. 5 is a plan view of a pallet lower part in the synthetic resin pallet shown in FIG. 1.
Figure 6:
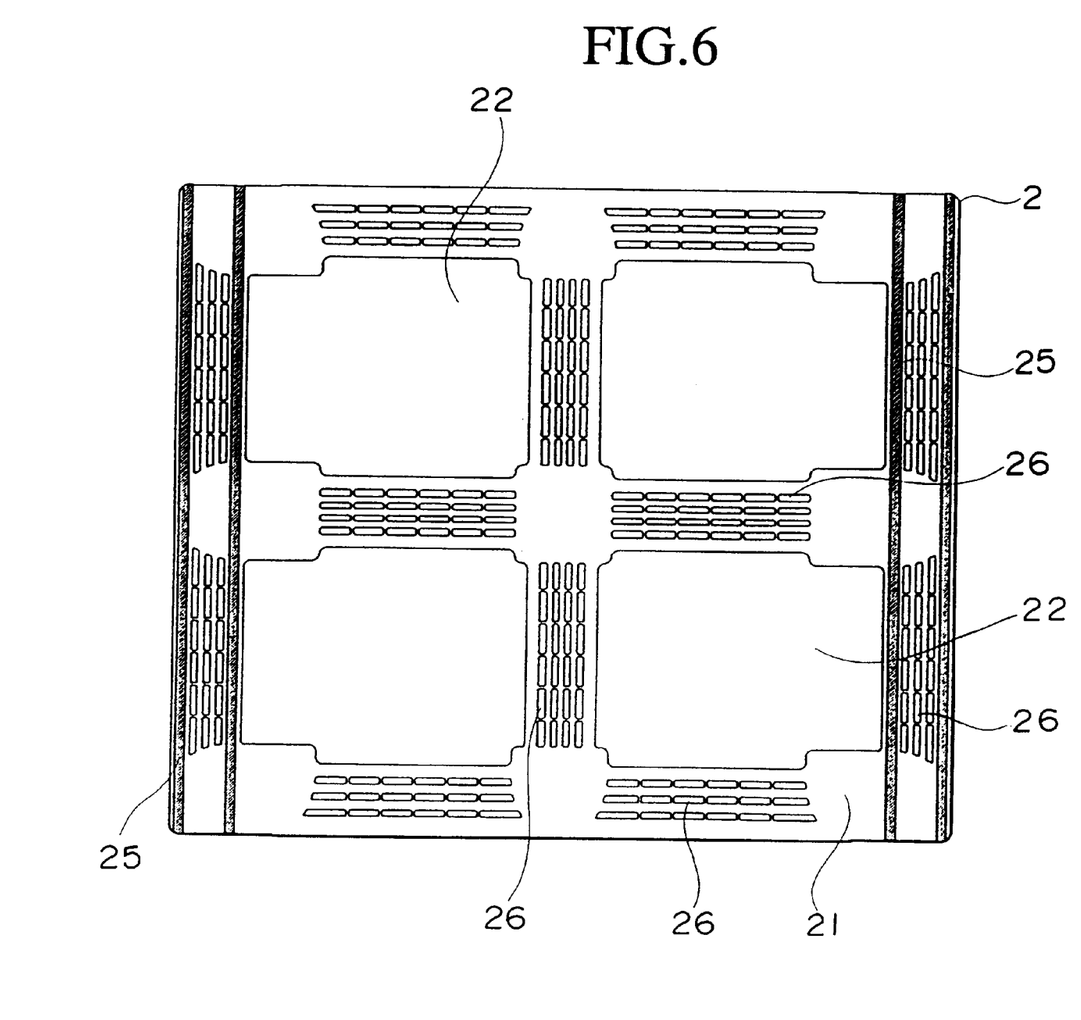
FIG. 6 is an underside view of the pallet lower part in the synthetic resin pallet shown in FIG. 1.

The columns 3 connecting the upper surface portion 11 and the under surface portion 21 comprise corner columns 31 formed at respective corners, intermediate portion columns 32 formed at intermediate portions of respective sides, and a central portion column 33 formed at a central portion. Fork insertion apertures 4 are formed between the columns 3 so that the forks of a hand lifter can be inserted from four directions of the synthetic resin pallet.

Reinforcing ribs 12 crossing in the form of a lattice are formed on the inner face side of the upper surface portion 11.

Figure 10:
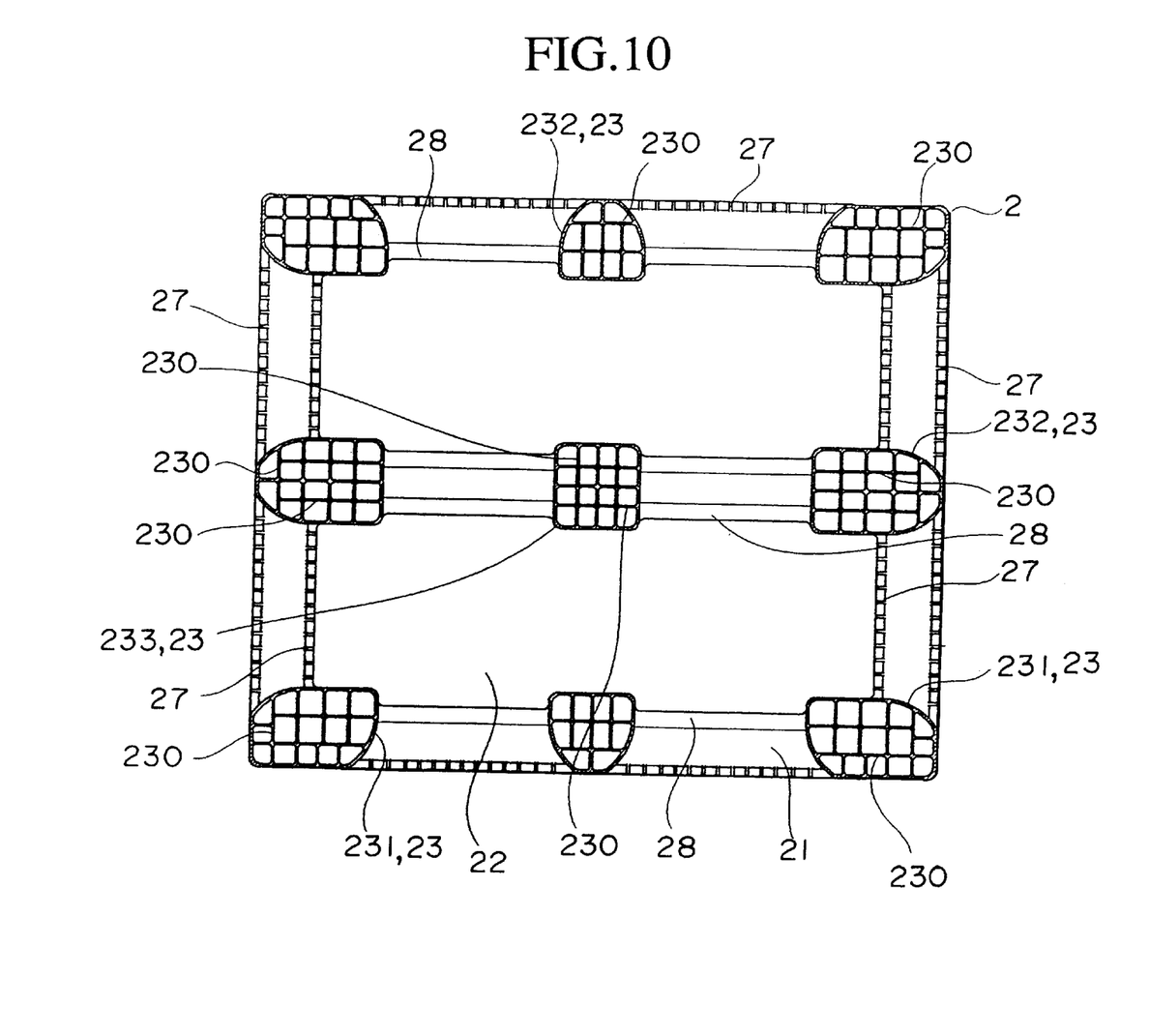
FIG. 10 is a plan view showing another embodiment of the pallet lower part in the synthetic resin pallet according to the present invention.
Figure 11:
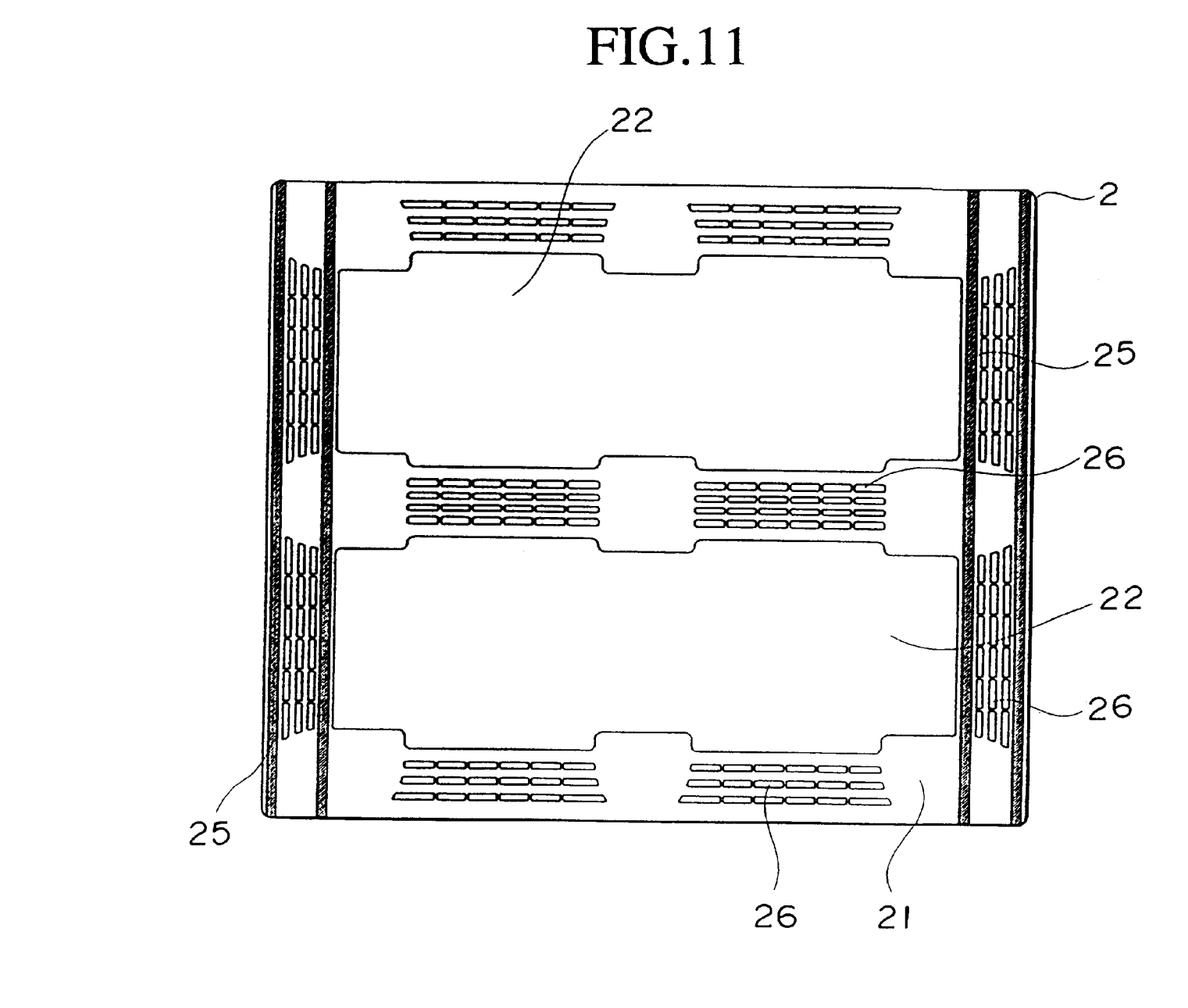
FIG. 11 is an underside view of the pallet lower part shown in FIG. 10.

The large open portions 22 are provided at four places in the under surface portion 21 for handling with a hand lifter. As a result, the shape of the under surface portion 21 in underside view is approximately the shape of a rectangle divided by a horizontal and a vertical line. Depending on requirements, as shown in FIG. 10 and FIG. 11, the open portions 22 may be provided at two places in the under surface portion 21 so that the shape of the under surface portion 21 in underside view is approximately the shape of a rectangle divided by a horizontal line.

Grommets 14 for preventing slipping are fitted to the upper surface portion 11. Furthermore, tapes 15 for preventing slipping are affixed to the outer face side of the upper surface portion 11.

Tapes 25 for preventing slipping are affixed to the outer face side of the under surface portion 21. Moreover a large number of indentations 26 are provided in the outer face side of the under surface portion 21.

To facilitate insertion and removal of the forks of a hand lifter into and out of the inner face side of the under surface portion 21, inclined ribs 27 or inclined faces 28 are formed along the inlets of the fork insertion apertures 4 and the sides of the open portions 22.

In manufacturing the synthetic resin pallet, at first the pallet upper part 1 integrally formed with the upper surface portion 11, corner column main portions 131, intermediate portion column main portions 132, and a central portion column main portion 133, is formed by injection molding, and the strengthened pallet lower part 2 integrally formed with the pallet under surface portion 21, corner portion column lower end portions 231, intermediate portion column lower end portions 232, and a central portion column lower end portion 233, is formed by injection molding. The column main portions 13 are the upper portions of the columns 3 excluding the column lower end portions 23. Preferably the upper portions are from 60 to 80% of the height of a normal column 3. As the method of strengthening the pallet lower part 2, a method involving adding a filler such as talc, calcium carbonate, glass fiber or carbon fiber at 15 to 30 weight % is suggested. Furthermore, when injecting the molten resin into the molds, a gas can be introduced into required parts of the molten resin to thereby form predetermined portions of the pallet upper part 1 and the pallet lower part 2, for example the hollow portions 10, and the hollow portions 20, thus forming openings in the wide thick portions.

It is normally preferable that no filler be added to the pallet upper part 1. However, a filler can be added to the pallet upper part 1 in an amount up to half of the amount of the filler added to the pallet lower part 2 in view of balance between improvement in strength of the pallet and reduction in weight of the pallet.

Figure 7A:
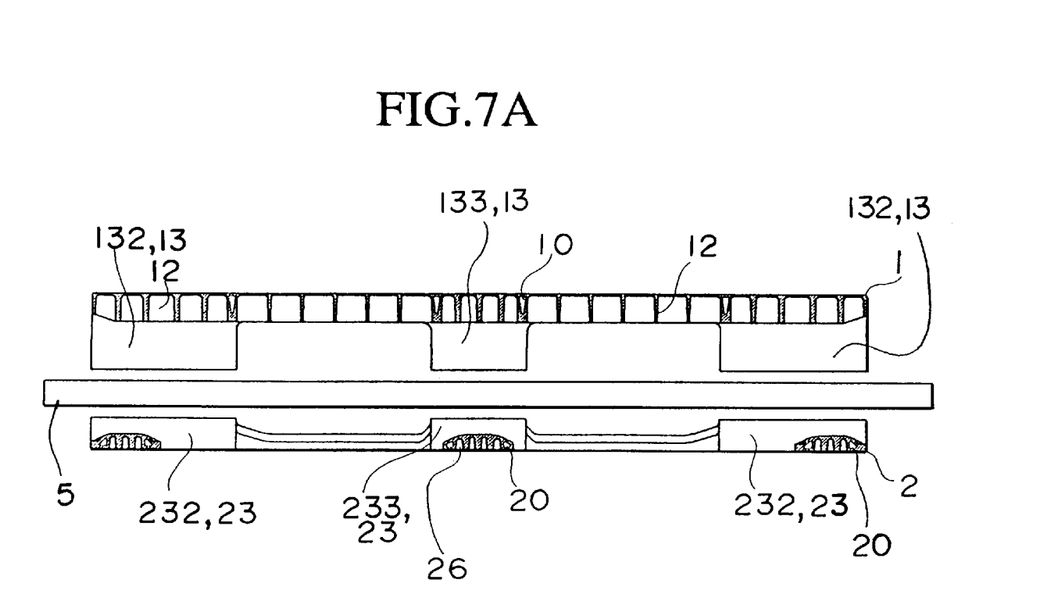
FIG. 7A is a sectional view showing a condition during connection of the pallet upper part and the pallet lower part in the synthetic resin pallet shown in FIG. 1.
Figure 7B:
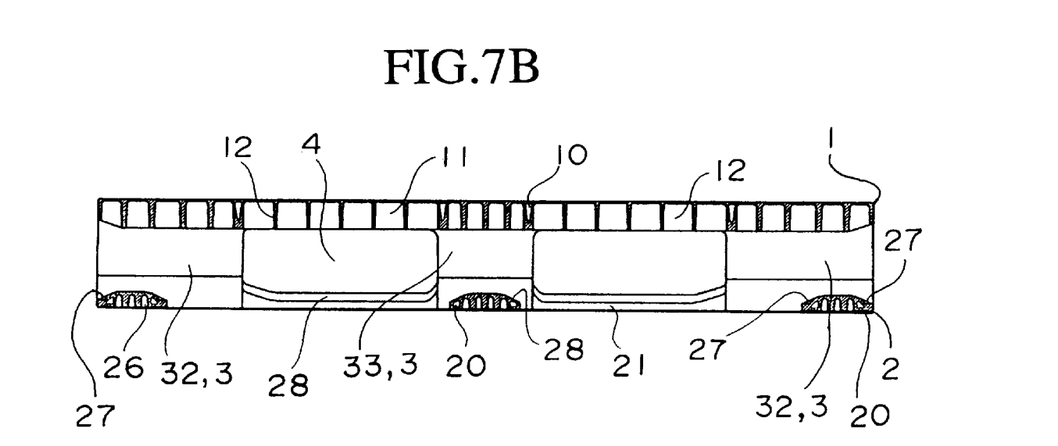
FIG. 7B is a sectional view along the line A—A in FIG. 3 of the synthetic resin pallet, with the pallet upper part and the pallet lower part connected.
Figure 8:
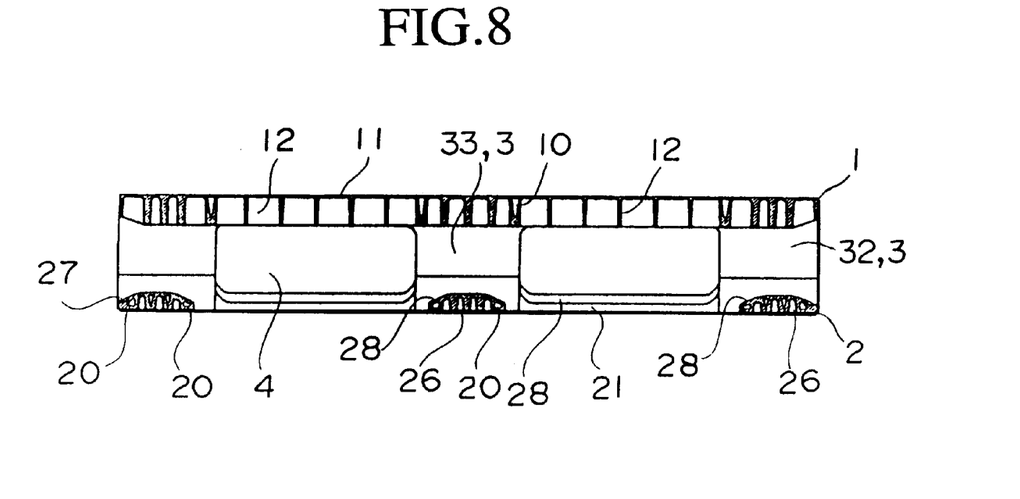
FIG. 8 is a sectional view along the line B—B in FIG. 3.
Figure 9:
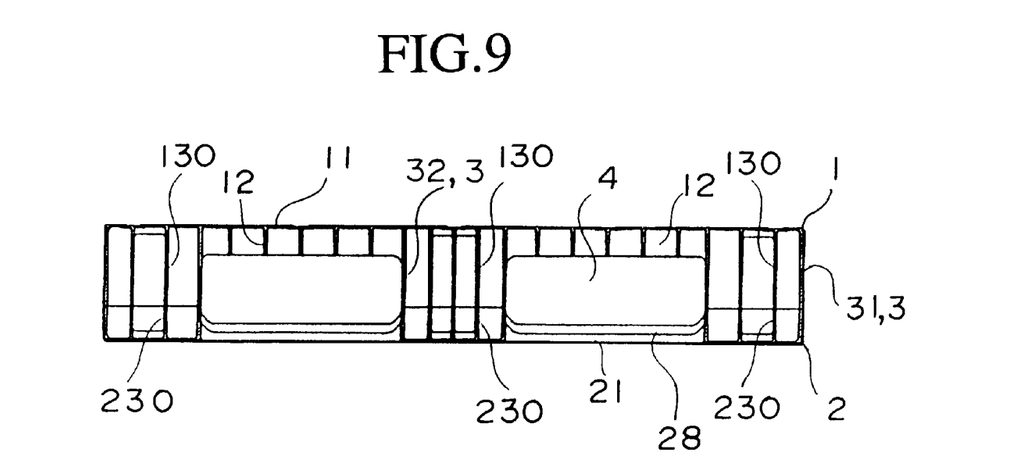
FIG. 9 is a sectional view along the line C—C in FIG. 3.

Then, for example as shown in FIG. 7A, the pallet upper part 1 and the pallet lower part 2 are positioned with the column main portions 13 and the column lower end portions 23 which are to be connected facing each other. That is, with the corner column main portions 131 and the corner column lower end portions 231, the intermediate portion column main portions 132 and the intermediate portion column lower end portions 232, and the central portion column main portion 133 and the central portion column lower end portion 233 facing each other. A metal plate 5 which has been heated and subjected to surface stripping treatment, is then inserted between the pallet upper part 1 and the pallet lower part 2. The pallet upper part 1 and the pallet lower part 2 are then pressed against the metal plate 5 for a predetermined time so that the contact portions are heated and melted. The pallet upper part 1 and the pallet lower part 2 are then separated from the metal plate 5, and the metal plate 5 is pulled out from therebetween. The pallet upper part 1 and the pallet lower part 2 are then pressed together and integrally connected by the respective column portions 31, 32 and 33 by heat welding. Partitions 130 are provided inside the respective column main portions 131, 132 and 133 of the pallet upper part 1, and partitions 230 are provided inside the respective column lower end portions 231, 232, and 233 of the pallet lower part 2. When the pallet upper part 1 and the pallet lower part 2 are integrally connected by heat welding, the partitions 130 and the partitions 230 are also integrally connected, and hence partitions are formed inside the respective columns 31, 32, and 33, extending from the upper surface portion 11 to the under surface portion 21. The strength of the respective columns 31, 32, and 33 can thus be increased.

As follows is a description of another embodiment of a synthetic resin pallet and manufacturing method therefor according to the present invention, with reference to FIG. 12 through FIG. 19.

Figure 12:
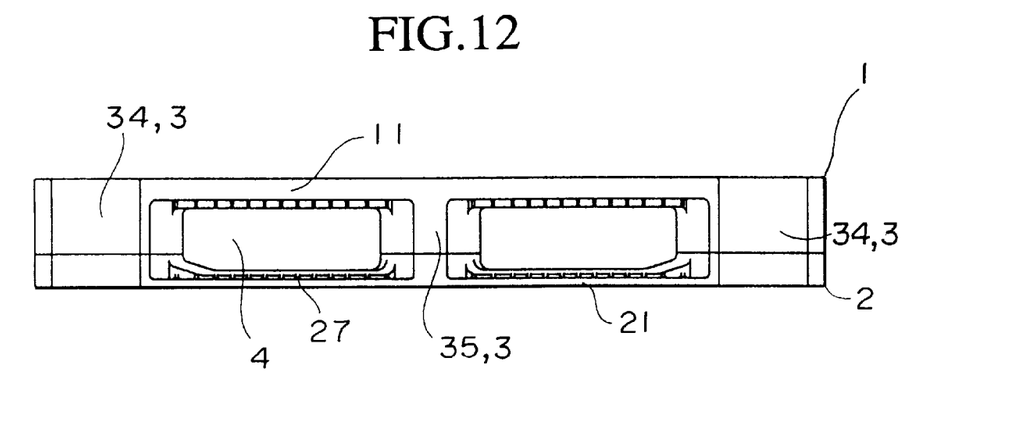
FIG. 12 is a front view showing another embodiment of a synthetic resin pallet according to the present invention.
Figure 13:
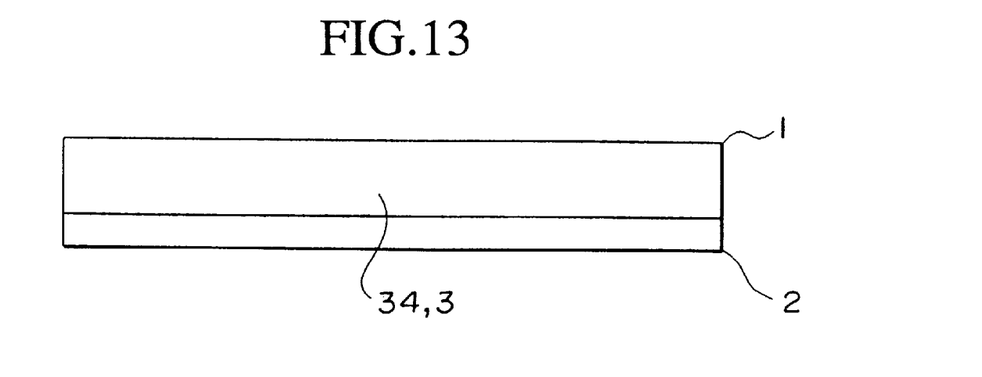
FIG. 13 is a side view of the synthetic resin pallet shown in FIG. 12.
Figure 14:
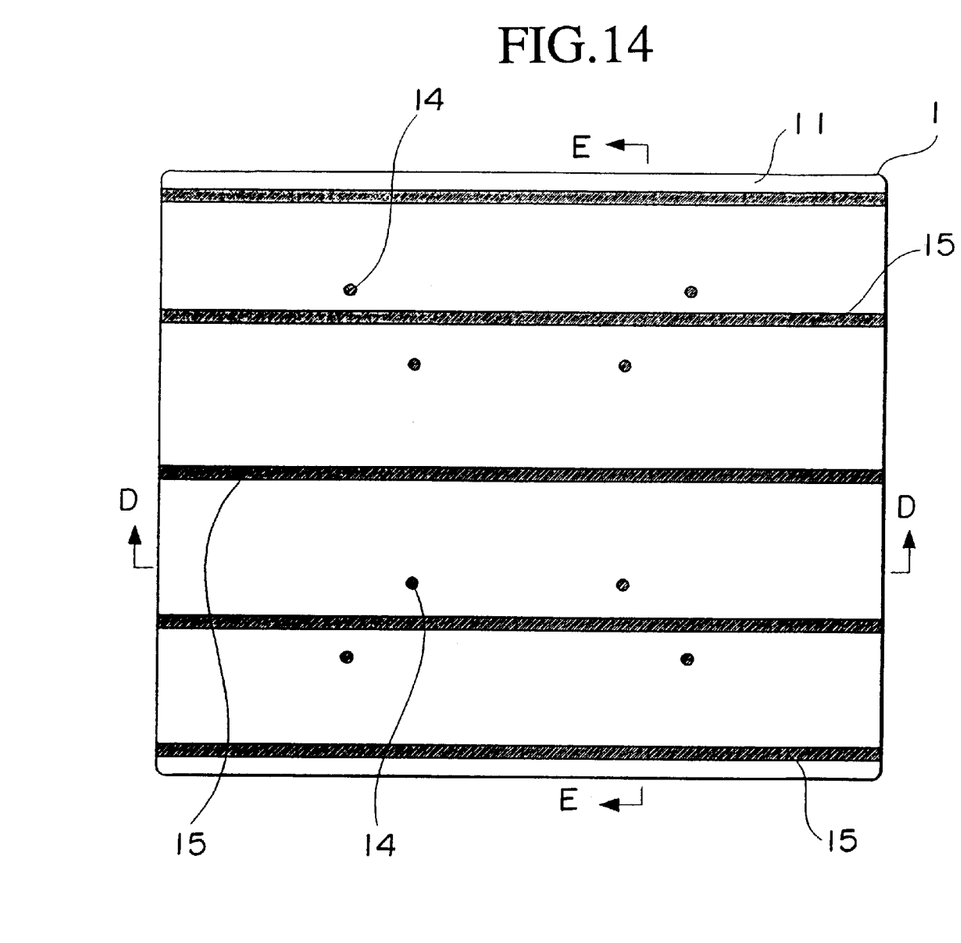
FIG. 14 is a plan view of the synthetic resin pallet shown in FIG. 12.

The synthetic resin pallet has an upper surface portion 11 and an under surface portion 21 which is provided with large open portions 22, with the upper surface portion 11 and the under surface portion 21 being connected by columns 3, with fork insertion apertures 4 formed between the columns 3.

Figure 16:
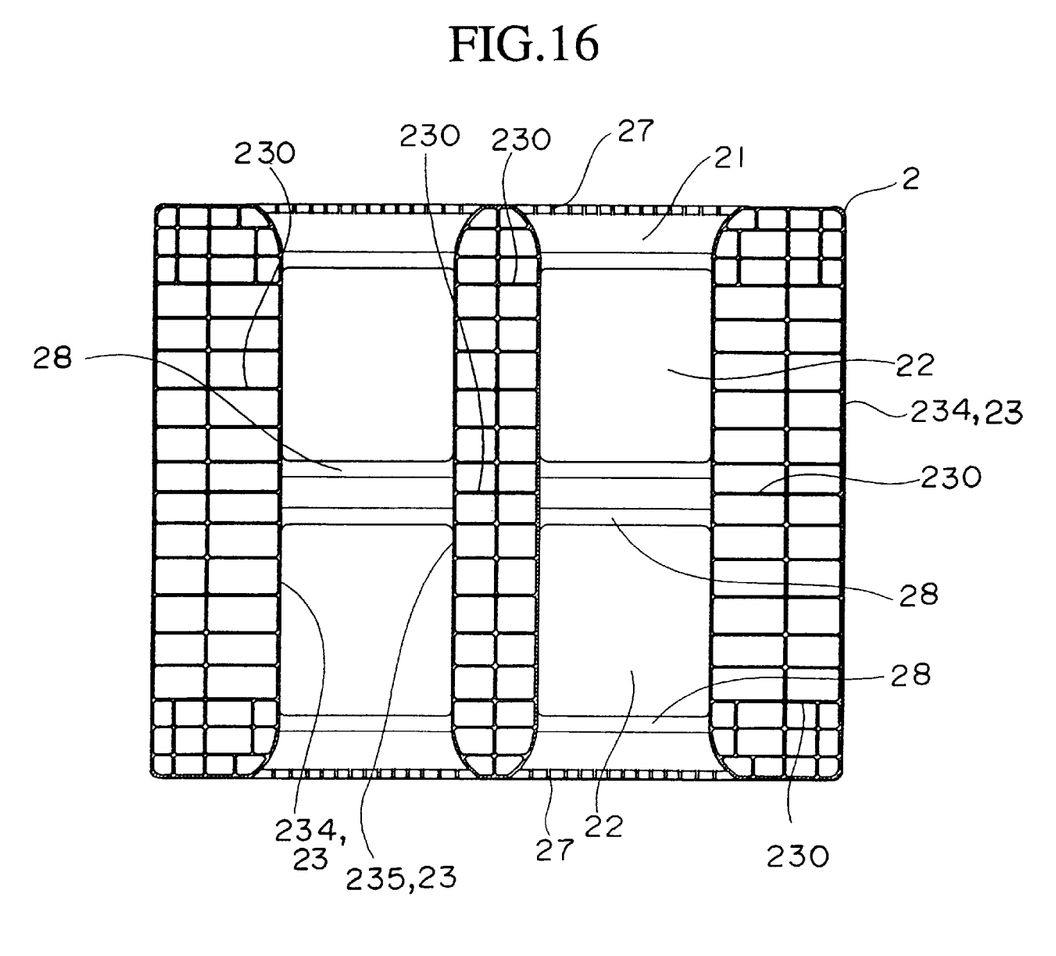
FIG. 16 is a plan view of the synthetic resin pallet lower portion in the synthetic resin pallet shown in FIG. 12.
Figure 17:
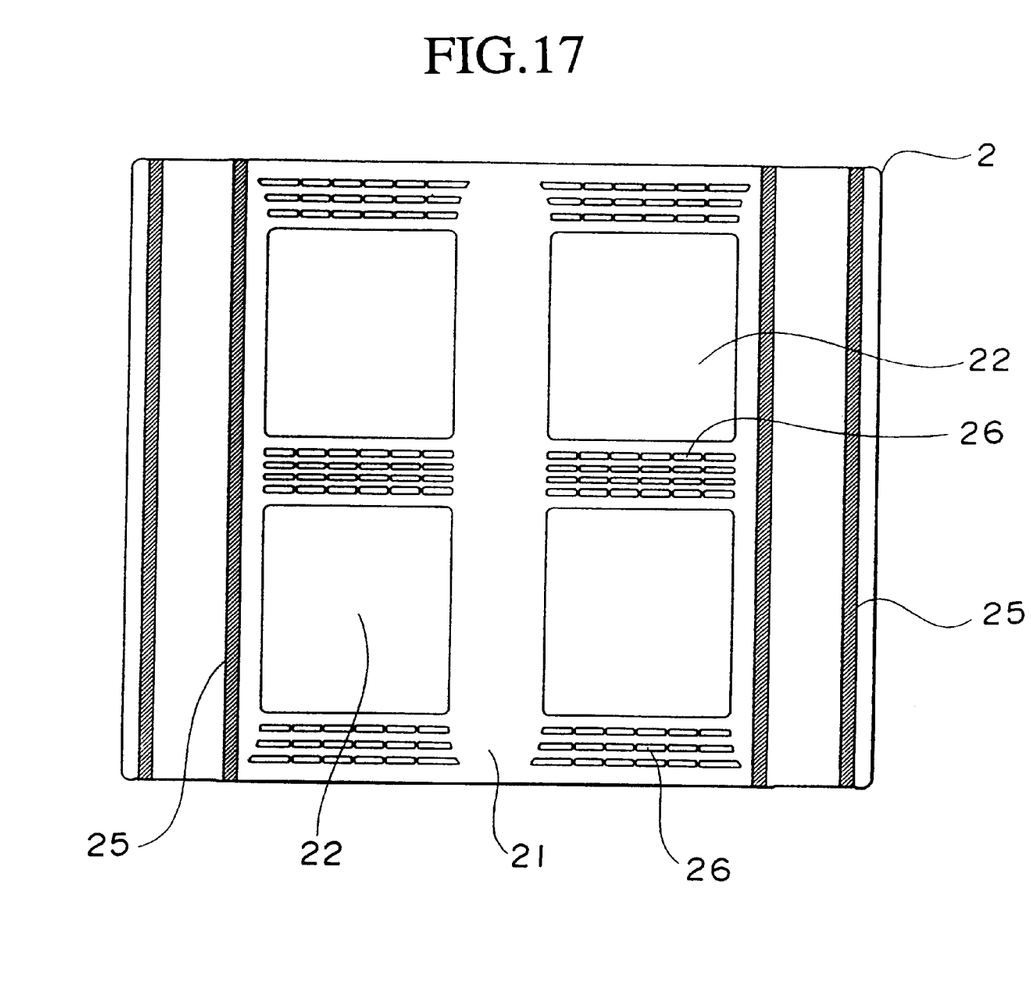
FIG. 17 is an underside view of the synthetic resin pallet lower portion in the synthetic resin pallet shown in FIG. 12.

The columns 3 connecting the upper surface portion 11 and the under surface portion 21 comprise side columns 34 formed along a pair of opposite sides, and a central column 35 formed in parallel with and at a central portion between the side columns 34. Fork insertion apertures 4 are formed between the columns 3 so that the forks of a hand lifter can be inserted from two directions of the synthetic resin pallet.

Figure 15:
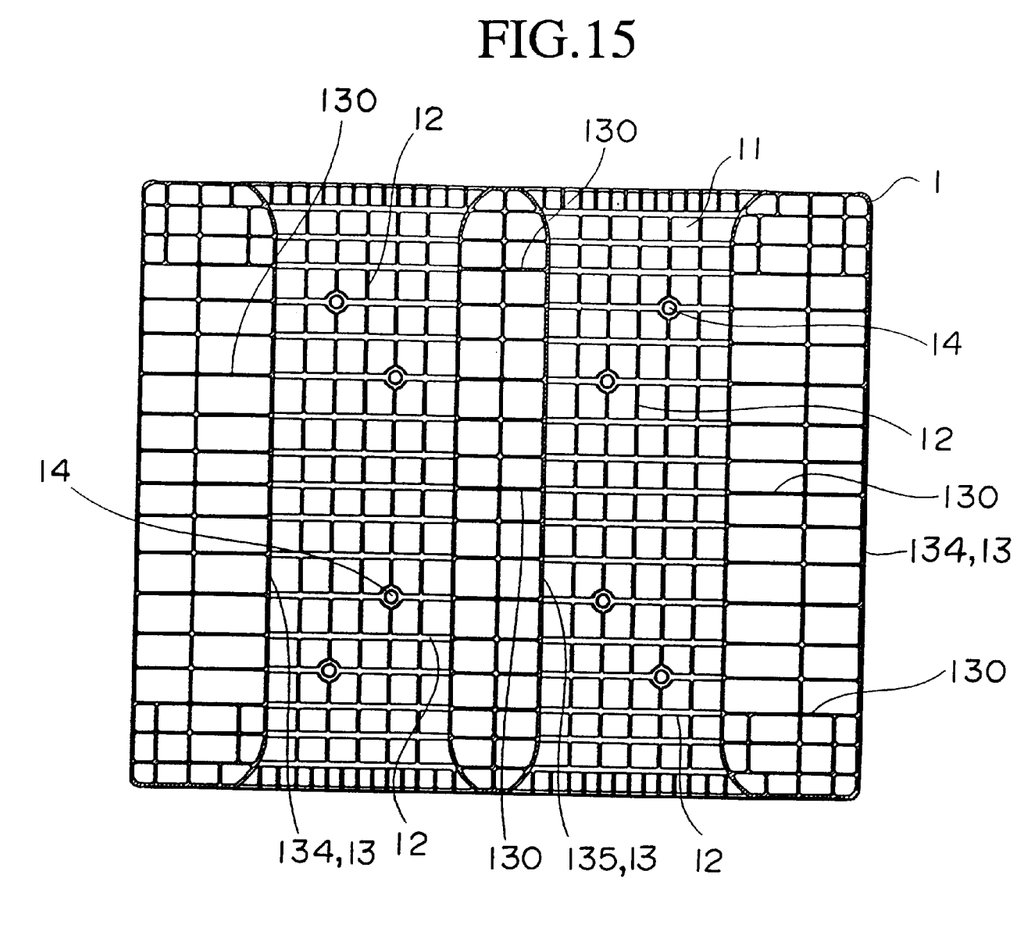
FIG. 15 is an underside view of the pallet upper part in the synthetic resin pallet shown in FIG. 12.

Reinforcing ribs 12 crossing in the form of a lattice are formed in the inner face side of the upper surface portion 11.

The large open portions 22 are provided at four places in the under surface portion 21 for handling with a hand lifter. As a result, the shape of the under surface portion 21 in underside view is approximately the shape of a rectangle divided by a horizontal and a vertical line.

Grommets 14 for preventing slipping are fitted to the upper surface portion 11. Furthermore, tapes 15 for preventing slipping are affixed to the outer face side of the upper surface portion 11.

Tapes 25 for preventing slipping are affixed to the outer face side of the under surface portion 21. Moreover a large number of indentations 26 are provided in the outer face side of the under surface portion 21.

To facilitate insertion and removal of the forks of a hand lifter into and out of the inner face side of the under surface portion 21, inclined ribs 27 or inclined faces 28 are formed along the inlets of the fork insertion apertures 4 and the sides of the open portions 22.

In manufacturing the synthetic resin pallet, at first a pallet upper part 1 integrally formed with the upper surface portion 11, side column main portions 134 and a central column main portion 135, is formed by injection molding, and a strengthened pallet lower part 2 integrally formed with the pallet under surface portion 21, side column lower end portions 234 and a central column lower end portion 235, is formed by injection molding.

Figure 18:
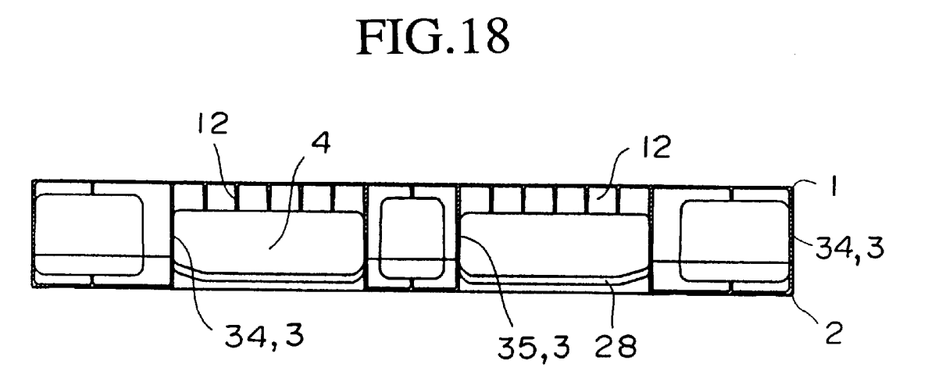
FIG. 18 is a sectional view along the line D—D in FIG. 14.
Figure 19:
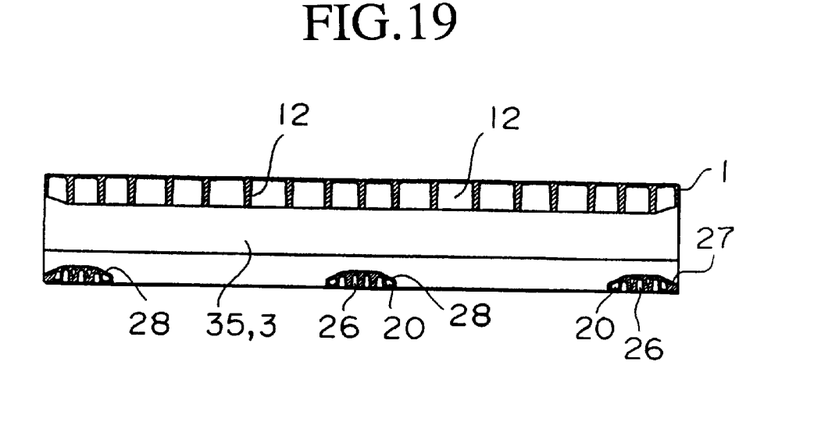
FIG. 19 is a sectional view along the line E—E in FIG. 14.

Then, the pallet upper part 1 and the pallet lower part 2 are positioned with the column main portions 13 and the column lower end portions 23 which are to be connected facing each other. That is, with the side column main portions 134 and the side column lower end portions 234, and the central column main portion 135 and the central column lower end portion 235 facing each other. A metal plate which has been heated and subjected to surface stripping treatment, is then inserted between the pallet upper part 1 and the pallet lower part 2. The pallet upper part 1 and the pallet lower part 2 are then pressed against the metal plate for a predetermined time so that the contact portions are heated and melted. The pallet upper part 1 and the pallet lower part 2 are then separated from the metal plate, and the metal plate is pulled out from therebetween. The pallet upper part 1 and the pallet lower part 2 are then pressed together and integrally connected by the respective column portions 34 and 35 by heat welding. Partitions 130 are provided inside the respective column main portions 134 and 135 of the pallet upper part 1, and partitions 230 are provided inside the respective column lower end portions 234 and 235 of the pallet lower part 2. When the pallet upper part 1 and the pallet lower part 2 are integrally connected by heat welding, the partitions 130 and the partitions 230 are also integrally connected, and hence partitions are formed inside the respective columns 34 and 35, extending from the upper surface portion 11 to the under surface portion 21. Hence the strength of the respective columns 34 and 35 can be increased.

The pallet upper part 1 and the pallet lower part 2 are preferably integrally connected by heat welding. However, as required, these may be integrally connected by adhesive, or by engaging protrusions into recesses.

The pallet upper part 1 and the pallet lower part 2 can be formed form a synthetic resin such as polyethylene or polypropylene. In the case where the pallet upper part 1 and the pallet lower part 2 are integrally connected by heat welding, then preferably the same synthetic resin is used for both.

What is claimed is:

1. A synthetic resin pallet having an upper surface portion and an under surface portion which is provided with large open portions, the upper surface portion and the under surface portion being connected by columns, with fork insertion apertures formed between the columns, wherein said synthetic resin pallet is integrally formed by connecting a pallet upper part integrally formed with the upper surface portion and column main portions, and a strengthened pallet lower part integrally formed with the under surface portion and column lower end portions, by the respective columns, wherein the pallet lower part is strengthened by adding a filler, and a filler is added to the pallet upper part in an amount of up to half the amount of filler added to the pallet lower part.

2. A synthetic resin pallet according to claim 1, wherein the connection by each column is provided by heat welding.

3. A synthetic resin pallet according to claim 1, wherein the shape of the under surface portion in underside view is approximately the shape of a rectangle divided by a horizontal and a vertical line.

4. A synthetic resin pallet according to claim 1, wherein the shape of the under surface portion in underside view is approximately the shape of a rectangle divided by a horizontal line.

5. A synthetic resin pallet according to claim 1, wherein reinforcing ribs are formed on an inner face side of the upper surface portion.

6. A synthetic resin pallet according to claim 1, wherein hollow portions are formed in the pallet upper part.

7. A synthetic resin pallet according to claim 1, wherein hollow portions are formed in the pallet lower part.

8. A synthetic resin pallet according to claim 1, wherein the columns comprise corner columns formed at respective corners, intermediate portion columns formed at intermediate portions of respective sides, and a central portion column formed at a central portion, and the fork insertion apertures are formed between the columns.

9. A synthetic resin pallet according to claim 1, wherein the columns comprise side columns formed along a pair of opposite sides, and a central column formed in parallel with and at a central portion between the side columns, and the fork insertion apertures are formed between the columns.

10. A method of manufacturing the synthetic resin pallet of claim 1, wherein the pallet upper part integrally formed with the upper surface portion and the column main portions is formed by injection molding, and the strengthened pallet lower part integrally formed with the pallet under surface portion and the column lower end portions is formed by injection molding, after which the pallet upper part and the pallet lower part are integrally connected by the respective columns, the pallet lower part being strengthened by adding a filler, and a filler being added to the pallet upper part in an amount of up to half the amount of filler added to the pallet lower part.

11. A method of manufacturing a synthetic resin pallet according to claim 10, wherein the integrality is formed by providing the connection by each column by heat welding.

12. A method of manufacturing a synthetic resin pallet according to claim 11, wherein the heat welding is effected using a metal plate which has been heated and subjected to surface stripping treatment.

13. A synthetic resin pallet according to claim 1, wherein the filler of the pallet lower part is talc, calcium carbonate, glass fiber, or carbon fiber.

14. A synthetic resin pallet according to claim 1, wherein the filler of the pallet upper part is talc, calcium carbonate, glass fiber, or carbon fiber.

15. A synthetic resin pallet according to claim 1, wherein no filler is added to the pallet upper part.

* * * * *